United States Patent Office 3,636,191
Patented Jan. 18, 1972

3,636,191
VACCINE AGAINST VIRAL HEPATITIS
AND PROCESS
Baruch S. Blumberg, Glenside, and Irving Millman, Willow Grove, Pa., assignors to The Institute for Cancer Research, Philadelphia, Pa.
Filed Oct. 8, 1969, Ser. No. 864,788
Int. Cl. A61k 27/00
U.S. Cl. 424—89
9 Claims

ABSTRACT OF THE DISCLOSURE

A vaccine against viral hepatitis is derived from blood containing Australia antigen, having particles resembling viruses which are substantially free from nucleic acid, of a size range of 180 to 210 A., substantially free from infectious particles. The vaccine where required is attenuated or altered. The preferred procedure for removing impurities including infectious components involves centrifugation, enzyme digestion, column gel filtration, differential density centrifugation in a solution of sucrose, dialysis, differential density centrifugation in a solution of cesium chloride, and dialysis.

DISCLOUSURE OF INVENTION

The invention relates to a vaccine against viral hepatitis and a process of preparation thereof.

A purpose of the invention is to remove a blood material, preferably plasma, from an animal, suitably a human being, whose blood contains Australia antigen and to substantially remove from the Australia antigen all normal blood constituents and infectious components and then to attenuate (alter) any residual infectious components which might be present in the Australia antigen fraction.

A further purpose is to remove impurities including infectious components from the Australia antigen fraction by enzyme digestion.

A further purpose is to remove impurities including infectious components from the Australia antigen fraction by differential density centrifugation, suitably in a solution of sucrose and separately in a solution of cesium chloride.

A further purposes is to remove impurities including infectious components from the Australia antigen fraction by centrifugation, enzyme digestion, column gel filtration, differential density centrifugation in a solution of sucrose, dialysis, differential density centrifugation in a solution of cesium chloride, and dialysis.

Further purposes appear in the specification and in the claims.

The drawings are diagrams, useful in explaining the invention.

FIG. 1 plots the result of gel filtration, plotting percent transmission at 280 m$\mu$ with respect to fraction number.

FIG. 2 shows immunoelectrophoretic patterns of fractions at different stages of purification. Pattern 1 is for starting plasma; pattern 2 is for pellet suspensions; pattern 3 is for the enzyme treated pellet suspension; pattern 4 is for the enzyme treated pellet suspension passed through gel filtration by Sephadex G–200. The trough contained horse anti-human serum antiserum.

Figure 4:
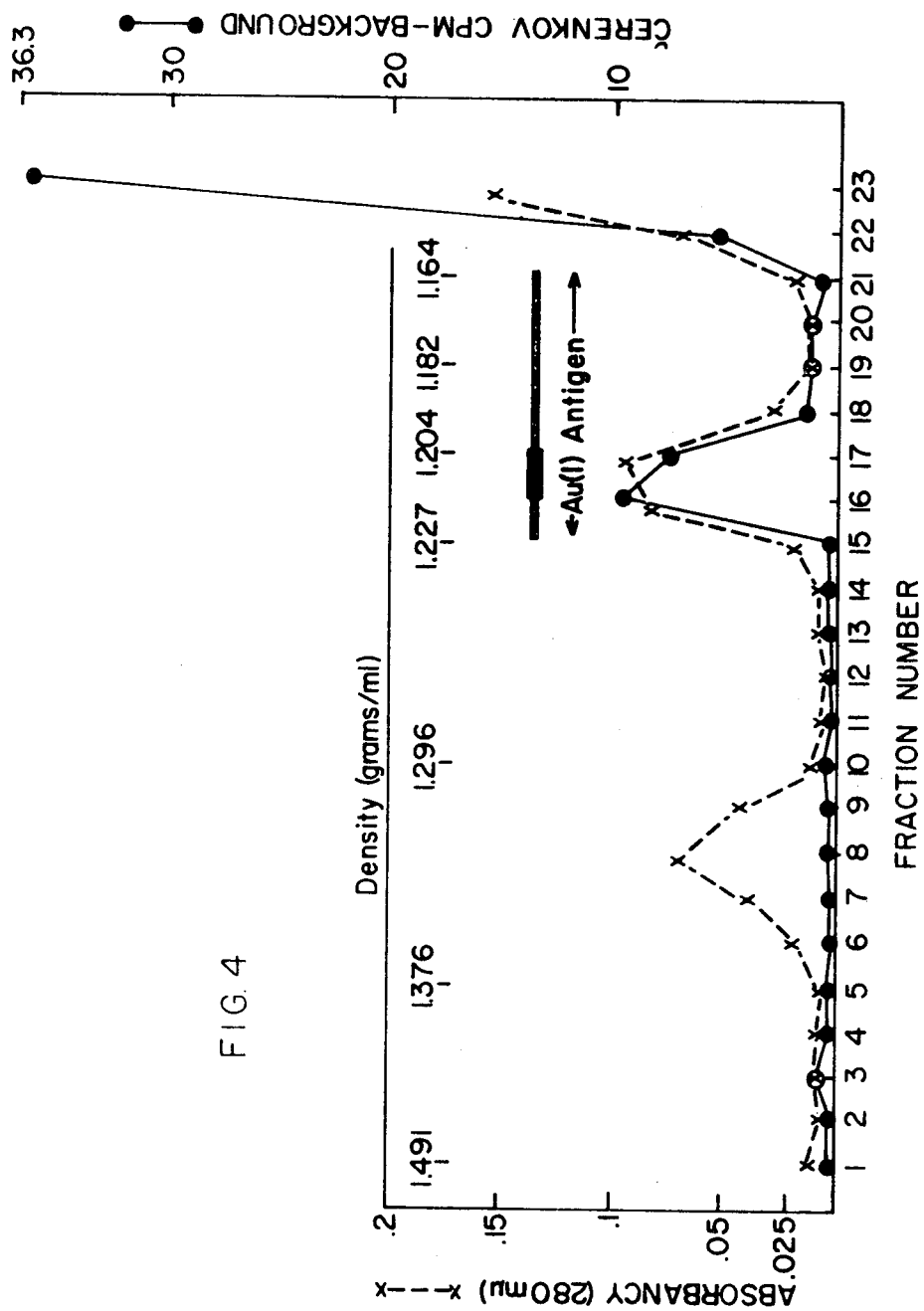
FIG. 4 is a density gradient showing a composite graph of the sucrose separated Au(1) fraction on cesium chloride plotting absorbancy at 280 m$\mu$ as one ordinate and Čerenkov CPM-Background as another ordinate, and Density in grams per ml. as one abscissa and fraction number as another abscissa.
Figure 5:
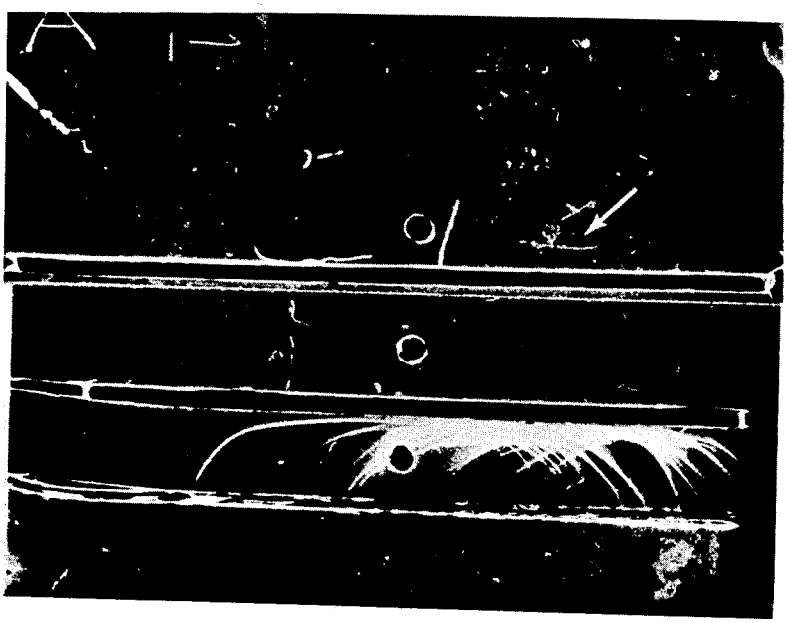

FIG. 5 shows immunoelectrophoretic patterns of purified Au(1) fractions 15 to 18 obtained in FIG. 4. Pattern 1 shows the Au(1) band (see arrow) developed by placing anti-Au(1) in the trough below. Pattern 2 shows the result of reacting Au(1) with anti total human serum protein placed in the trough below. Pattern 3 shows the result when whole plasma containing Au(1) reacts with anti-human serum antiserum in the trough above.

Figure 6:
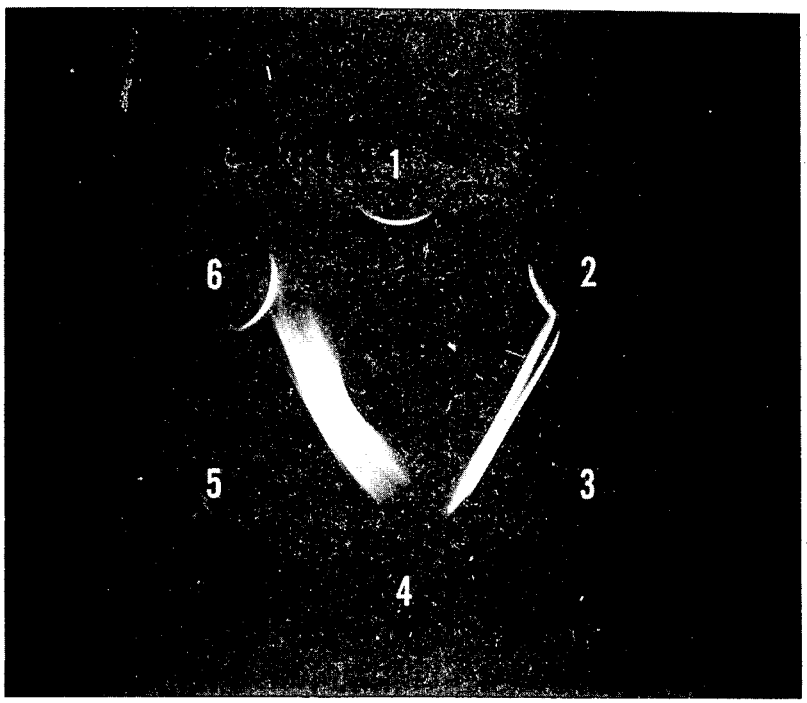

FIG. 6 is an immunodiffusion pattern of purified Au(1) fractions 15 to 18 from FIG. 4. In the experiment the central well contained horse anti total human serum antiserum. Wells 1 and 2 contained purified Au(1) (5 $\mu$l. and 20 $\mu$l. respectively). Wells 3 and 5 contained other fractions of plasma isolated in earlier stages of the purification scheme.

Figure 7:
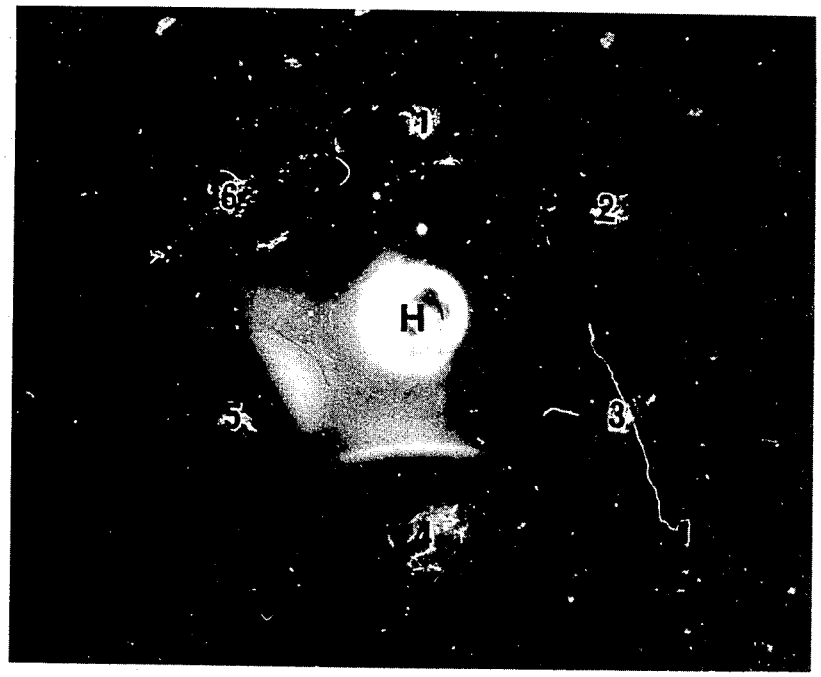

FIG. 7 shows the immunodiffusion pattern of the Au(1) fraction after various treatments. The center well contained human anti-Au(1) antiserum. Wells 2 and 3 contained the Au(1) fraction heated at 100° C. for one hour (5 and 20 $\mu$l. respectively). Well 4 contained ether treated Au(1); well 5 contained chloroform treated Au(1); wells 1 and 6 contained the Au(1) fraction heated at 85° C. for one hour (5 and 20 $\mu$l. respectively).

Figure 8:
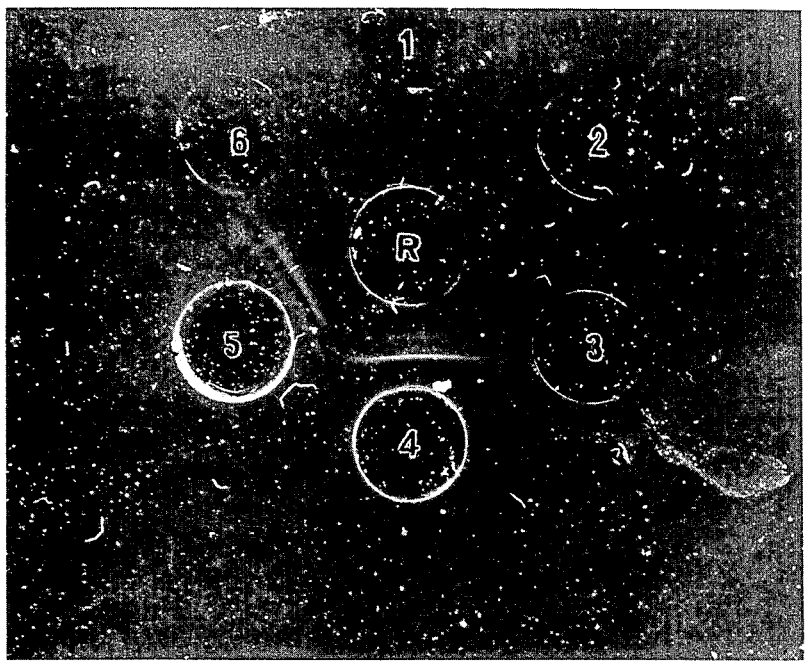

FIG. 8 shows immunodiffusion patterns of the Au(1) fraction after various treatments. The protocol was the same as in FIG. 7 except that the center well contained rabbit anti-Au(1) antiserum.

Figure 9:
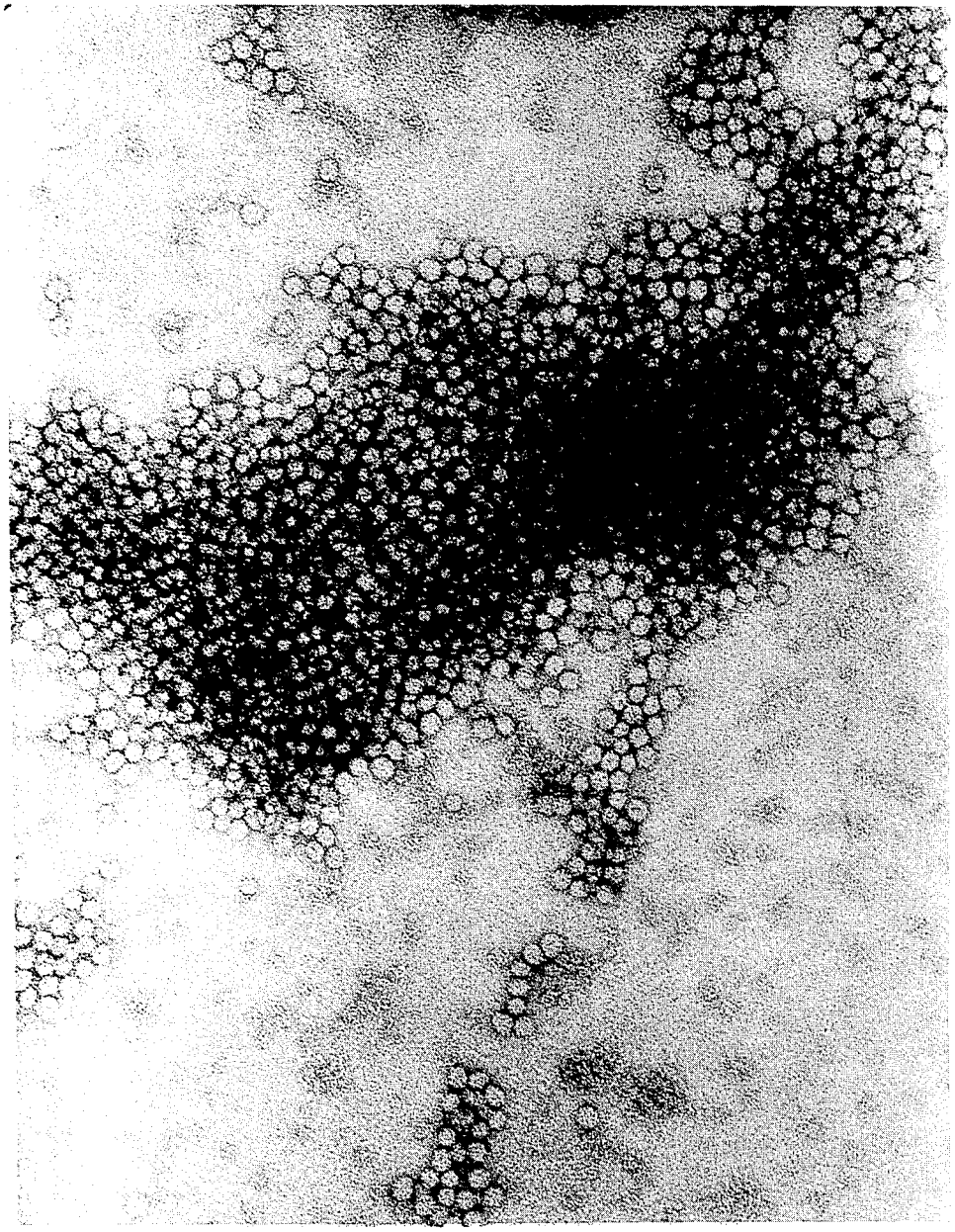

FIG. 9 shows particles of the most purified fraction negatively stained and at a magnification of 300,000 diameters under the electron microscope.

The nature of Australia antigen

Australia antigen, which is designated generally Au and specifically in respect to the material under study as Au(1), was first detected by Blumberg, Bull. N.Y. Acad. Med. 40, 377 (1964), in the serum of an Australian aborigine. Its geographical distribution is widespread, since it is present in the blood of a large portion of the populations of the Pacific Islands, Southeast Asia, India and in many other tropical areas. It is also present in the blood of many institutionalized mongoloids (Down's syndrome). Au is also present in the blood of many patients who suffer from viral hepatitis. The geographical distribution, disease association, genetics and physical and chemical characteristics of Au have been reviewed by Blumberg, Sutnick and London, Bull. N.Y. Acad. Med. 44, 1566 (1968).

The occurrence of Australia antigen in acute and chronic hepatitis has also been described by Blumberg, Gerstley, Hungerford, London and Sutnick, Ann. Int. Med. 66, 924 (1967); Sutnick, London, Gerstley, Crunlund and Blumberg, J. Am. Med. Assoc. 205, 670 (1968); Sutnick, London and Blumberg, Am. J. Digest, Des. 14, 189 (1969); Blumberg, Sutnick and London, J. Am. Med. Assoc. 207, 1895 (1969); and London, Sutnick and Blumberg, Ann. Int. Med. 70, 55 (1969).

Initial studies have revealed the presence of particles of a size of 180 to 210 A., which are specifically agglutinated in the serum of patients who have viral hepatitis. Bayer, Blumberg and Werner, Nature 218, 1057 (1968).

The ability to stain intranuclear granules in liver cells of hepatitis patients with the same antisera coupled with fluorescein shows that these cells contain a common antigen with serum particles. Millman and Blumberg U.S. patent application Ser. No. 852,930, filed Aug. 25, 1969 for Reagent and Test for Hepatitis; Millman, Zavatone, Gerstley and Blumberg, Nature 222, 181 (1969).

Vaccine

The virus causing hepatitis exhibits some of the unusual properties which are also exhibited by Australia antigen. For example both have a diameter less than 260 A., both survive exposure to 56° for 30 minutes and both survive freezing at minus 10° C. to minus 20° C. for at least one year. Kissling, Transmission of Virus by the Water Route (Inter-science Publishers, John Wyley & Sons, 1965) 337. The causative agent must be present in the blood of affected individuals in high concentration or must be of high infectivity since small amounts of this blood if transferred by needle puncture can cause infection. The same is true of Australia antigen.

We have discovered that Australia antigen from blood can be purified by removing blood components and substantially all infectious components, out of excess of caution Australia antigen can be attenuated (altered) to remove any residual infectious components and it can be administered to human beings as a vaccine which will protect some people against viral hepatitis, we believe by causing the formation of antibodies in the blood of some of the persons who receive the vaccine.

Our experience indicates that Australia antigen isolated from blood is abnormally low in, or free from nucleic acids, although we do not rely on this theory. Australia antigen appears to be the "shell" of a virus which causes hepatitis minus its nucleic acids. While Australia antigen in some cases has associated with it some infectious particles which will correspond to the "shell" plus nucleic acid, the infectious particles are normally present in minor proportions.

Source of Australia antigen

While Australia antigen can be found in the blood of some non-human primates, it is best to obtain it from the blood of a human being in which it is present. It is best, however, not to use a patient suffering from active hepatitis but to employ a patient having Australia antigen in his blood, but able to tolerate it without serious infectious symptoms. A large proportion of the population in tropical countries and many persons suffering from Down's syndrome are in this category.

It is preferred to use plasma as a source of Australia antigen rather than whole blood. Plasma may be removed by plasmaphoresis or other methods.

Purification of Australia antigen

One of the important discoveries incident to the present invention is that Australia antigen is strongly resistant to enzyme digestion, whereas human blood cells and other plasma components can be reduced to peptides and removed without impairing the Austrialia antigen. In this operation it is believed that some of the infectious components are eliminated.

Another important aspect of the present invention is that impurities including infectious components can be eliminated from the Australia antigen fraction by differential density centrifugation, which can be carried out in a solution of cesium chloride, and preferably also in a separate solution of sucrose, the solvent in both cases being water.

As a result of these purification techniques a relatively concentrated very pure suspension of Australia antigen in a medium such as saline solution, substantially free from impurities including infectious components can be obtained by the invention. This purified and relatively concentrated suspension of Australia antigen is suitable for use as a vaccine against hepatitis. As a precaution, however, against the possibility that some residuum of infectious components may remain, the vaccine is attenuated or altered as later explained.

PREFERRED TECHNIQUE FOR PURIFICATION

Sedimentation

The serum obtained by plasmaphoresis is subjected to high centrifugal force in an ultracentrifuge. One hundred ml. of plasma is clarified by centrifugation for one hour at $2000 \times g$ in a Sorvall refrigerated centrifuge and then re-centrifuged at $370,000 \times g$ for 18 hours in a Spinco 65 Ti angle rotor ultracentrifuge. Only the pellet at the bottom of the tube contained Au(1). The remaining liquid was removed by decantation and the pellet was resuspended to 10 ml. of 0.85% (w./v.) weight of sodium chloride solution in water.

Enzyme digestion

To 10 ml. of the Au(1) suspension just referred to in a 30 ml. stoppered bottle, 400 µl. of amylase at a weight concentration of 10 mg./ml., 400 µl. of lipase at a weight concentration of 1 mg./ml. and 200 µl. neuraminidase at a weight concentration of 1 mg./ml. were added. This mixture was incubated at 37° C. with gentle agitation for 15 minutes, then 100 µl. of phospholipase C at a weight concentration of 1 mg./ml. were added. The incubation and agitation were continued for 20 minutes. During this period it was noted that the mixture gelled. To the gel was added 2 ml. of pronase at 10 mg./ml. weight concentration and the mixture was incubated and agitated for one hour. At the end of this period the gel had been completely dissolved and an additional 2 ml. of pronase of the same concentration was added. The incubation and agitation were continued for an additional hour and then the mixture was cooled in an ice bath.

While a specific preferred procedure is given, it will be evident that any of a wide variety of enzymes may be used in the procedure referred to above. Among the enzymes which are suitable are trypsin, pronase, lipase, phospholipase, ribonuclease, deoxyribonuclease, amylase, neuraminidase, wheat germ lipase and alpha amylase. Any other suitable enzyme may be employed if desired.

Gel filtration

Five ml. aliquots of the enzyme treated suspension above were subjected to gel filtration through a column of preferably Sephadex G–200 produced by Pharmacia, Uppsala, Sweden. This column retains the smaller units but allows the heavier Au to come through quickly. It works by analogy to a mechanical sieve. Salts and inorganic materials are also retarded. The Au comes through in the first peak.

Figure 1:
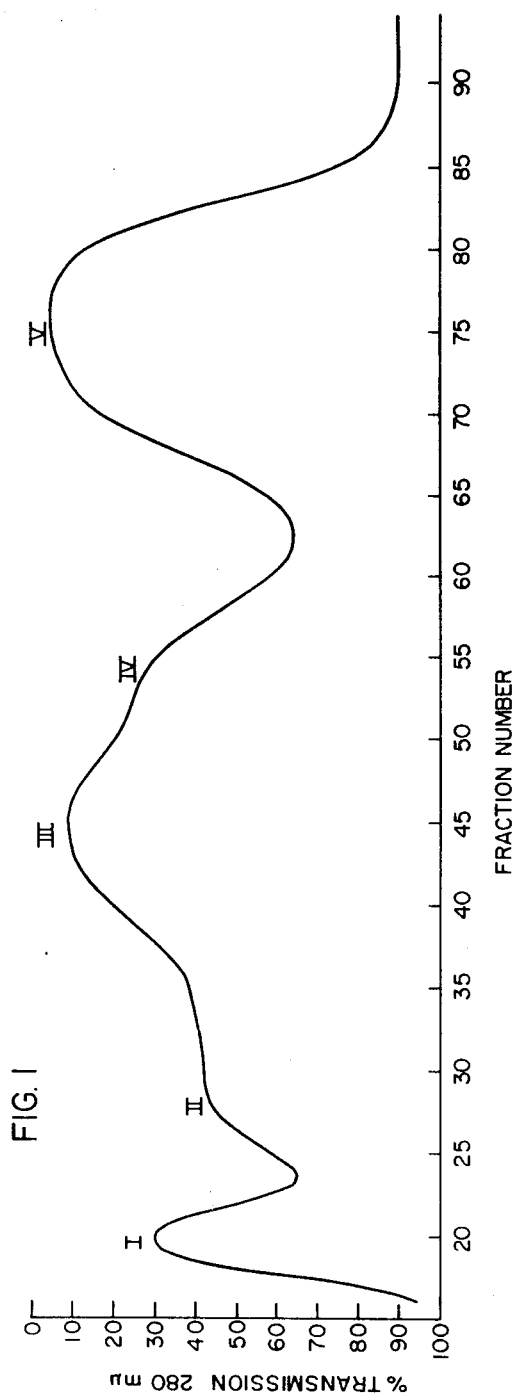

The column was 650 mm. long and 32 mm. in diameter and it had been previously equilibrated with 0.85% by weight sodium chloride solution in water. The elution was carried on with the same solution and all of the Au(1) positive material was eluted in the peak 1 as shown in FIG. 1.

Figure 2:
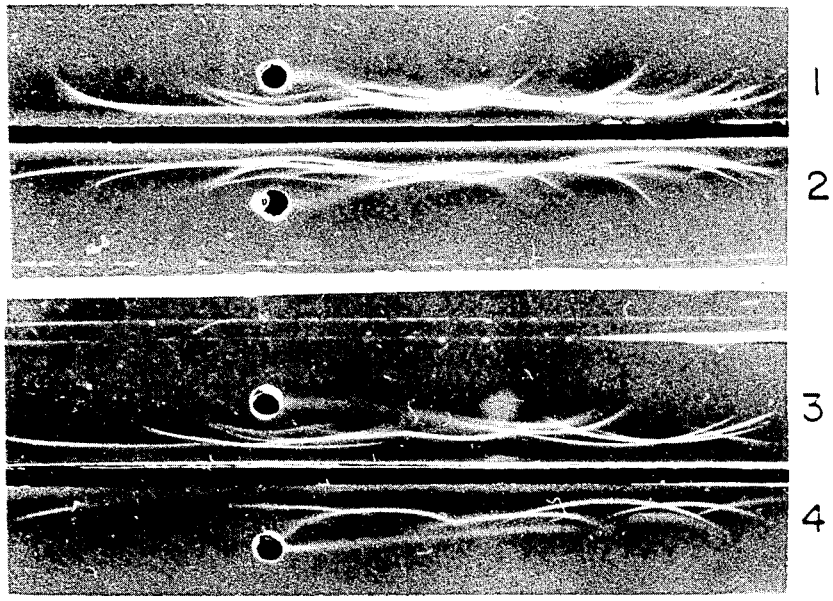

After the separation by electrophoresis as shown in FIG. 2 the patterns were devolped by adding horse anti human serum antiserum to the troughs. The decrease in the number and intensity of precipitin bands of the product should be noted in pattern 3 and 4. All of the fractions which comprise the first peak which contained all of the Au(1) antigenicity were combined.

Sucrose gradient

The combined fractions from peak 1 obtained from the gel filtration were dialyzed against 0.01 M potassium chloride solution in water, lyophilized (freeze dried) and subjected to sedimentation on sucrose gradients in an ultracentrifuge. In carrying out this operation the tube of the ultracentrifuge is filled with progressive increments of sucrose solution, the most concentrated being at the bottom and the least concentrated being at the top. The specimen resuspended in distilled water is layered on top of the differential density increments. The usual range of sucrose concentration in the bottom layer is about 30%

Figure 3:
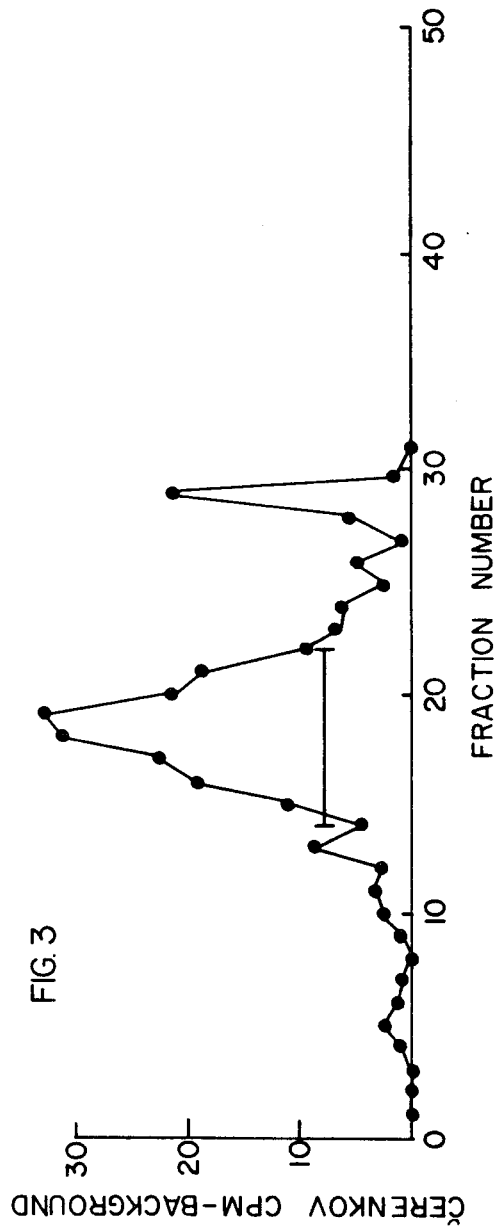
FIG. 3 is a sucrose gradient profile, plotting Čerenkov CMP-Background against fraction number.

(w./v.) and the sucrose concentration in the top layer is about 10% (w./v.) but other differential concentratial concentrations can be used. If desired an automatic machine well known in the art can supply the sucrose gradient. For test purposes the Au(1) had been rendered radioactive prior to the initial operation and FIG. 3 shows an analysis of the gradient for $^{32}$P incorporation and antigenicity. Those fraction 18 to 23 inclusive with major "Čerenkov" radioactivity and antigenicity were combined.

As shown in FIG. 3, the line within the radioactivity peak represents Au(1) positive range when assayed by immunodiffusion. The sucrose gradients were prepared and sampled by the method of Martin and Ames, J. Biol. Chem. 236, 1372 (1961). One ml. of material was layered over each of the two 32.5 ml. linear sucrose gradients from 10 to 30% by volume in 0.01 M tris maleate buffer at a pH of 7.4. The gradients were centrifuged in a SW 27 Spinco rotor at 57,000 $\times g$ for 20 hours at 2 to 5° C. Forty drop fractions were removed by puncturing the bottom of the tubes and radioactivity and antigenicity of each fraction was determined as described below.

It is preferred to use a zonal ultracentrifuge for this purpse and for other differential density centrifugations as later explained but a standard ultracentrifuge may be used if desired.

While sucrose differential density centrifugation is desirable in purifying the vaccine according to the invention, it is not essential and this step can be eliminated if desired.

The active fraction after differential density centrifugation in sucrose solution was dialyzed and lyophilized to remove the sucrose and concentrate the Au.

Centrifugation in cesium chloride

The Au from differential density centrifugation above were subjected to sedimentation on cesium chloride gradients. The pooled immunoreactive fractions from the sucrose density tubes of FIG. 3 were dialyzed against 0.01 M. potassium chloride solution in water at 5° C. for 18 hours and lyophilized. The dried Au(1) fraction was then resuspended in a small amount of distilled water and mixed with saturated cesium chloride solution to produce a final density of 1.3 determined by a refractometer. The final volume of the mixture was 5 ml. This was centrifuged in a Spinco SW 50 rotor at 222,000$\times g$ to equilibrium in about 40 hours. Ten drop fractions were collected by puncturing the bottom of the tube.

Instead of using the technique described, a preformed linear cesium chloride density gradient either in a centrifuge tube or a zonal rotor may be used. At the end of the centrifugation the Au bands at a certain level as determined by assay. The infectious particles are denser and separate at a lower level.

FIG. 4 shows an analysis of the gradient for $^{32}$P incorporation, 280 m$\mu$ absorption, density, and antigenicity. Antigenicity (presence of Au(1)) was spread between fractions 15 and 21 with greatest activity in fraction 16. The relative activity of each fraction was determined by 2 fold dilution titration. That fraction which could be diluted the farthest and produce a precipitin line was considered the peak fraction. Fraction 16 has a density of 1.21 and it falls within both the 280 m$\mu$ and the "Čerenkov" peaks. The 280 m$\mu$ peak seen in FIG. 4 fraction 8, is an unknown protein that does not separate on sucrose gradient alone and contains no Au(1) antigenicity. Fractions 15 to 18 were pooled, dialyzed against 0.01 M solution of potassium chloride in water and lyophilized.

FIG. 9 is a photomicrograph of Au(1) contained in the most purified Australia antigen fraction.

ATTENUATION OR ALTERATION

FIGS. 5 and 6 show the results of analysis of the pooled antigenic fractions 15 and 18 obtained by differential density centrifugation in cesium chloride. There is complete absence of reactivity with horse anti-human serum in FIG. 5, pattern 2, compared with the starting whole plasma of pattern 3. The presence of Au(1) is seen in pattern 1 (at the arrow) in which the purified material was tested with human anti-Au(1). The precipitin band appears to be in the same position and has the same configuration as the band formed by the unpurified Au(1) (not shown). This indicates resistance of the antigen to the previous enzyme treatment and gradient manipulations. In FIG. 6 the purified fractions 15 to 18 are seen to contain no human components when tested by immunodiffusion since wells 1 and 2 contained this fraction pool and there is no line of precipitation when reacted with the central well containing horse anti-human antiserum. Peripheral wells 3 and 5 contain other Au(1) fractions from earlier stages of purification for comparison.

An absorption spectrum analysis of purified Au(1) reveals only a suggestion of absorbing material at 260 m$\mu$. There appears to be a shoulder at 275 m$\mu$ and prominent peaks at 280 m$\mu$ and 290 m$\mu$.

The product produced as described above when suspended in a suitable medium such as physiological saline solution is an effective vaccine against viral hepatitis.

In order to be sure that the vaccine is safe it should be subjected to control testing, suitably using tissue culture assay or other assay to establish that no infectious material is present. Infectivity should be determined both before and after attenuation or modification. The test animals of choice are the marmoset, chimpanzee, African green (Vervet) or squirrel monkey.

The control test requires that a biopsy sample from the liver be obtained and the presence or absence of infection be determined either by the fluorescent technique referred to above or by any standard histological technique.

Even though control assays establish the absence of infectious components, as an extra precaution the vaccine may be subjected to attenuation, which term as used herein includes what is sometimes called alteration. Any well known technique for attenuation or alteration of a vaccine may be employed, among which the following are suggested:

(a) Formaldehyde solution is added in progressively increasing quantities. This procedure is preferred. Samples are removed after each addition of formaldehye and tissue culture or other assay is employed, until infectious components are eliminated. An initial concentration of formaldehye may be 0.1 M and suitable increments up to 0.7 M may be added. Time of contact and pH of reaction are important and would have to be determined for each batch since these factors are empirical. Solution of phenol (0.5%) or thimerosal (Merthiolate, Lilly) (1–10,000) in combination with aging at temperatures of 2°–10° C. or varying periods of time may be substituted until infectious components are eliminated.

(b) The vaccine is subjected to ultraviolet irradiation and at the end of each exposure a sample is removed for assay until no infectious properties are exhibited. The exposure time for each batch is empirical and would have to be determined.

(c) $\beta$ propiolactone in increments may be added and samples removed after each addition for assay until no infectious properties exist.

(d) The vaccine may be subjected to heat treatment at gradually increasing temperature and a sample removed for assay after each increase in temperature. When a sample ceases to exhibit any infectious properties the heat treatment will cease. Tests show that the vaccine loses its antigenicity activity after treatment at 85° C. or 100° C. for one hour but is stable at 56° C. for one hour. The heat treatment temperature even for a short time should not exceed 85° C.

The test for potency of the vaccine may be made in any suitable host, such as the rabbit, guinea pig, mouse or monkey. The test is positive when Au(1) antibody is induced.

DOSAGE, ADMINISTRATION AND UTILIZATION

Any dosage and method of administration may be used which will cause the vaccine to enter the blood stream and act effectively on the immune mechanism of the body to cause the production of antibodies.

The vaccine may be enhanced by the incorporation of adjuvants such as aluminum hydroxide, aluminum phosphate or others commonly known as the Arts.

The vaccine of the invention can be administered intramuscularly or subcutaneously or by other suitable means. Intravenous administration is not preferred because of the possible presence of pyrogens in the vaccine. Intramuscular administration is preferable.

While the vaccine may be administered to persons generally, it is recommended particularly for persons subjected to high risk of viral hepatitis, including transfusion and infectious hepatitis. These persons include soldiers, sailors and other persons living in tropical areas or other areas where hepatitis is common. The vaccine is particularly recommended for those in closely associated organizations, including prisons, Down's syndrome patients, drug addicts, patients suffering from leprosy or liable to leprosy, physicians and attendants in hospitals and institutions, especially those for mentally retarded patients, persons likely to receive numerous blood transfusions, such as those suffering from hemophilia or thalassemia. The vaccine is recommended for more general use in case of an epidemic of viral hepititis.

Resistance of Au(1) to enzyme

A serum fraction containing Au(1) and particles purified by the method of Alter and Blumberg, Blood 27, 297 (1966), was standardized to a concentration which produced a sharp precipitin line when assayed by the immunodiffusion technique. Twenty-five μl. portions of this fraction were reacted with a series of enzymes under the optimal conditions described by the suppliers of the enzymes (Worthington Biochemical Corporation). The enzymes include trypsin, wheat germ lipase, neuraminidase, alpha amylase, phospholipase C, ribonuclease and deoxyribonuclease. In addition pronase obtained from Calbiochemical Corporation was dissolved in distilled water at a concentration by weight of 2 mg./ml. and 5 μl. of this enzyme solution was reacted with 25 μl. of Au(1) of the Au(1) fraction. All enzyme reactions were carried out at 37° C. for one hour.

In contrast with others antigens which have been tested and which were degraded by these enzymes, this treatment did not damage Au(1) and is suitable as a method of purification.

Resistance to other agents

The effect of elevated temperatures on Au(1) was determined by incubating equal volumes of Au(1) and 0.1 M tris maleate buffer at pH 7.5 at temperature of 56° C., 85° C. and 100° C. for one hour. The effect of elevated temperatures is shown in FIGS. 7 and 8. The heat treatment at 85° C. and 100° C. destroyed any detectable antigenicity while ¼ of the amount (5 μl.) of untreated control produced a precipitin band. No effect was observed after heating at 56° C. for 1 hour and a line of identity (not shown) with the untreated control was observed.

The effect of ether and chloroform on Au(1) was determined in the same manner but at room temperature for 1 hour. The solvents were removed by evaporation in a vacuum dessicator. Both ether and chloroform treatments may have uncovered antigen groups since two bands appear where one appeared previously in FIGS. 7 and 8. One of the precipitin bands on the ether treatment of the Au(1) fraction appears to be different from one of the two bands seen following the chloroform treatment of the Au(1) fraction in FIG. 8, since they cross and do not form a line of identity. It will be evident that other organic solvents or surface action agents may be useful in the purification and/or attenuation procedures.

Phenol extraction and gradient centrifugation

The small amount of $^{32}P$ in the most purified fractions does not appear to be associated with nucleic acids of high molecular weight. To the combined fractions 15 to 18 obtained by differential density centrifugation in cesium chloride was added 2 mg. of calf thymus deoxyribonucleic acid as a carrier. After extraction with phenol by the procedure of Thomas and Abelson, Procedures in Nucleic Acid Research (Harper and Row 1966) p. 557 and centrifugation in cesium chloride gradient, no radioactivity was detected in the density region corresponding to nucleic acids. Fluorometric assay of the most purified fractions indicated less than 1% of deoxyribonucleic acid. Assay for ribonucleic acid indicated an amount less than the lower limit of the sensitivity of the assay which would correspond to less than 10% of the weight of the total protein.

DISCUSSION AND RESULTS

It is very evident that enyzme digestion does not affect Australia antigen as determined by both immunological characteristics and by examination under the electron microscope. The remarkable stability of Au(1) after such treatment makes it possible to remove human plasma protein as a preliminary step. The absence of serum proteins in the vaccine has been demonstrated by the lack of immunological activity with human serum antiserum as determined by immunoeletrophoresis and by immunodiffusion analysis.

The appearance of the particles in cesium chloride gradient fractions under the electron microscope does not differ from that reported by Bayer, Blumberg and Werner, Nature, 218, 1057 (1968).

The particles have a diameter of 180 to 210 A. and resemble viruses in their uniformity of size. The particles appear to contain sub-units and central "cores." The size and shape of Au(1) particles are similar to those of the adeno associated (AAV) parvo and picornavirus groups. 1 Fenner, Biology of Animal Viruses (Academic Press, 1968) 12.

In the most purified fraction there is no evidence of the presence of any significant amount of nucleic acid. No antigenic material or particles under the electron microscope were detected in other cesium chloride fractions.

The density of the cesium chloride gradient peak which contained the maximum radioactivity and Australia antigen immunodiffusion activity was 1.21 confirming the work of Alter and Blumberg, Blood 27, 297 (1966). The low density of purified Au(1) may be due to the lack of nucleic acids and/or the presence of lipids. The presence of lipids in Australia antigen has been suspected due to the staining reaction of Australia antigen precipitin bands. Alter and Blumberg, Blood 27, 297 (1966). It is contemplated that treatment of the purified Australia antigen by organic solvents or surface active agents may increase the density due to the removal of lipids.

The chemical and physical properties of Au(1), the lack of nucleic acid, and the high concentrations found in the sera of patients with viral hepititis indicate that the majority of Au(1) particles are incomplete viruses or capsids.

It will be evident that the principles of the invention are applicable to producing vaccines from other specifications, strains, varieties, variants, and types of Au.

In view of our invention and disclosure, variations and modifications to meet individual whim or particular need will doubtless become evident to others skilled in the art, to obtain all or part of the benefits of our invention without copying the process and composition shown, and we, therefore, claim all such insofar as they fall within the reasonable spirit and scope of our claim.

Having thus described our invention what we claim as new and desire to secure by Letters Patent is:

1. A vaccine against viral hepatitis essentially consisting of Australia antigen, having particles substantially free from nucleic acids, of a size range of 180 to 210 A., being substantially free from infectious particles, having a density of approximately 1.21 and being in an amount sufficient to produce antibodies, the balance being a medium which is physiologically acceptable.

2. A vaccine of claim 1, essentially free of blood components other than Australia antigen.

3. A process of producing a pure vaccine against viral hepatitis, which comprises substantially removing impurities including infectious components from blood material containing Australia antigen by a process including as a major feature differential density centrifugation in a solution of cesium chloride, and adding a physiologically acceptable vehicle.

4. A process of claim 3, which includes as a precautionary feature a step adapted to attenuate any virus that might remain after the step directed to subsanial removal of impuriies has been completed.

5. A process of producing a pure vaccine against viral hepatitis, which comprises substantially removing impurities including infectious components from blood material including Australia antigen by a process including as a major feature enzyme digestion, and adding a physiologically acceptable vehicle.

6. A process of producing a pure vaccine against viral hepatitis, which comprises substantially removing impurities including infectious components from blood material including Australia antigen by centrifugation, enzyme digestion, column gel filtration, differential density centrifugation in a solution of sucrose, dialysis, differential density centrifugation in a solution of cesium chloride, and dialysis, and adding a physiologically acceptable vehicle.

7. A process of producing pure vaccine against viral hepatitis, which comprises substantially removing impurities including infectious components from blood material containing Australia antigen by enzyme digestion, attenuating any remaining infectious components, and adding a pharmaceutically acceptable vehicle.

8. A process of producing a pure vaccine against viral hepatitis, which comprises substantially removing impurities including infectious components from blood material containing Australia antigen by enzyme digestion, differential density centrifugation in a solution of sucrose, differential density centrifugation in a solution of cesium chloride, attenuating any remaining infectious components and incorporating the vaccine with a pharmaceutically acceptable vehicle.

9. A process of producing a pure vaccine against viral hepatitis, which comprises substantially removing impurities including infectious components from blood material containing Australia antigen by centrifugation, enzyme digestion, column gel filtration, differential density centrifugation in a solution of sucrose, dialysis, differential density centrifugation in a solution of cesium chloride, and dialysis, attenuating any remaining infectious components and incorporating the vaccine with a pharmaceutically acceptable vehicle.

References Cited

Bayer et al.: Nature, vol. 218, pages 1057–1059, June 15, 1968.

RICHARD L. HUFF, Primary Examiner